US010633572B2

(12) United States Patent
Kumar et al.

(10) Patent No.: US 10,633,572 B2
(45) Date of Patent: Apr. 28, 2020

(54) PROCESS FOR DISSOCIATION OF HYDRATES IN PRESENCE OF ADDITIVES OR HYDRATE DISSOCIATION PROMOTERS

(71) Applicants: Council of Scientific & Industrial Research, New Delhi (IN); GAIL (India) Limited, New Delhi (IN)

(72) Inventors: Rajnish Kumar, Pune (IN); Sudip Roy, Pune (IN); Gaurav Bhattacharjee, Pune (IN); Nilesh Choudhary, Pune (IN); Asheesh Kumar, Pune (IN); Raj Kumar Kashyap, Noida (IN); Parivesh Chugh, Noida (IN); Nawal Kishore Pande, Noida (IN)

(73) Assignees: Council of Scientific & Industrial Research, New Delhi (IN); Gail (India) Limited, New Delhi (IN)

( * ) Notice: Subject to any disclaimer, the term of this patent is extended or adjusted under 35 U.S.C. 154(b) by 0 days.

(21) Appl. No.: 16/071,621

(22) PCT Filed: Jan. 23, 2017

(86) PCT No.: PCT/IN2017/050034
§ 371 (c)(1),
(2) Date: Jul. 20, 2018

(87) PCT Pub. No.: WO2017/125954
PCT Pub. Date: Jul. 27, 2017

(65) Prior Publication Data
US 2019/0031943 A1 Jan. 31, 2019

(30) Foreign Application Priority Data

Jan. 22, 2016 (IN) .............................. 201611002385
Jan. 22, 2016 (IN) .............................. 201611002386

(51) Int. Cl.
  C09K 8/52 (2006.01)
  C10L 3/06 (2006.01)
  C10L 3/10 (2006.01)

(52) U.S. Cl.
  CPC ........ *C09K 8/52* (2013.01); *C10L 3/06* (2013.01); *C10L 3/107* (2013.01);
  (Continued)

(58) Field of Classification Search
  None
  See application file for complete search history.

(56) References Cited

U.S. PATENT DOCUMENTS 4,007,787 A 2/1977 Cottle
5,713,416 A 2/1998 Chatterji et al.
(Continued)

FOREIGN PATENT DOCUMENTS

| JP | H0525986 A | 2/1993 |
| WO | 2014137648 A1 | 9/2014 |
| WO | 2015002544 A2 | 1/2015 |

OTHER PUBLICATIONS

Horikoshi et al., "Introduction to Nanoparticles", In: "Microwaves in Nanoparticle Syntheses", First Edition, 2013 Wiley VCH Verlag GmbH & Co. KGaA, Weinheim, Germany, Apr. 24, 2013, pp. 1-24.
(Continued)

*Primary Examiner* — John J Figueroa
(74) *Attorney, Agent, or Firm* — Dinsmore & Shohl, LLP

(57) ABSTRACT

The present invention discloses a process for the dissociation of natural gas hydrates comprises injecting additives or hydrate dissociation promoters into the system at the hydrate dissociation temperatures ranging from 283-293 K in conjunction with or without first depressurizing the system to
(Continued)

pressures (50%-75%) below the hydrate equilibrium pressure and such leading to the recovery of methane or natural gases.

12 Claims, 13 Drawing Sheets

(52) U.S. Cl.
CPC ...... *C09K 2208/10* (2013.01); *C09K 2208/22* (2013.01); *C10L 2230/04* (2013.01); *C10L 2290/141* (2013.01); *C10L 2290/48* (2013.01)

(56) References Cited

U.S. PATENT DOCUMENTS

| | | | |
|---|---|---|---|
| 6,214,175 | B1 | 4/2001 | Heinemann et al. |
| 7,879,767 | B2 | 2/2011 | Baycroft et al. |
| 2003/0178195 | A1 | 9/2003 | Agee et al. |
| 2014/0262265 | A1* | 9/2014 | Hutchins ............ C09K 8/92 166/280.2 |

OTHER PUBLICATIONS

Choudhary et al., "Methane Hydrate Dissociation by Thermal Stimulation in Presence of Kinetic Inhibitors N-Vinylpyrrolidone: Experiments and Molecular Dynamics Simulation", Proceedings of the 8th International Conference on Gas Hydrates (ICGH8-2014), Beijing, China, 2014, pp. 1-8.

Xiaolan et al., "Gas Hydrate Inhibition of Drilling Fluid Additives", Proceedings of the 7th International Conference on Gas Hydrates (ICGH 2011), Jul. 17, 2011, Edinburgh, Scotland, United Kingdom, pp. 1-8.

Arora et al., "Effects of Biosurfactants on Gas Hydrates", Journal of Petroleum & Environmental Biotechnology, vol. 5, Issue 2, 2014, pp. 1-7.

Ji et al., "Natural gas production from hydrate decomposition by depressurization", Chemical Engineering Science, 56, 2001, pp. 5801-5814.

Zhang et al., "Methane Index: a tetraether archael lipid biomarker indicator for detecting the instability of marine gas hydrates", Earth and Planetary Science Letters, 307, 2011, pp. 525-534.

International Search Report and Written Opinion, completed May 24, 2017, pertaining to PCT/IN2017/050034 filed Jan. 23, 2017.

\* cited by examiner

A

B

C

PROCESS FOR DISSOCIATION OF HYDRATES IN PRESENCE OF ADDITIVES OR HYDRATE DISSOCIATION PROMOTERS

FIELD OF THE INVENTION

The present invention provides a process for dissociation of hydrates. More particularly, the present invention relates to a process for the dissociation of gas hydrates, specifically of methane or natural gas, into their constituent chemical species, namely the hydrate-forming gas and water in presence of suitable additive agent or hydrate dissociation promoters.

BACKGROUND OF THE INVENTION

India is fourth largest energy consumer in the world. Energy consumption in India has doubled in last decade. Potential hydrate deposits have been found in Andaman-Nicobar Island, Krishna Godavari basin, Konkan and Kutch offshore. A reliable assessment of the feasibility of producing natural gas from the earth's naturally occurring hydrates requires several pieces of key information. The specific challenges encountered for methane recovery from gas hydrates are as follows:

1. Cost of operation
2. Scalability of operation
3. Faster hydrate dissociation kinetics The thermodynamics of such systems is fairly well understood, and thus methane recovery through hydrate dissociation can be achieved by maintaining a certain temperature/pressure gradient in and around the hydrate bearing sediment (several meters below sea level). The higher temperature gradient required, the more difficult and expensive is the process. Introduction of suitable additives (in low doses) to the system which can potentially change the thermodynamic boundary would allow reduction in working temperature thus would be beneficial economically. These additives would interact with the hydrogen bonds or create defects in the ice like hydrate crystals, enabling an enhanced hydrate dissociation rate at relatively lesser temperature gradient. The other factor that needs to be kept in mind while identifying the additives discussed earlier is their potential impact on the environment. Although gas hydrates are known to occur in marine sediments around the world, little is known about the technology necessary to recover gas from gas hydrates. The three primary processes currently being deliberated upon when it comes to recovery of gas from gas hydrates are a) Thermal Stimulation, b) Depressurization and c) Additive Injection. Individually, though effective, these methods have their own unique disadvantages which make the hydrate dissociation process highly uneconomical and cumbersome. Some work combining the depressurization and thermal stimulation methods and the resultant of the same has been observed to enhance hydrate dissociation kinetics compared to the individual processes. It is expected that a mature process using a combination of all the three approaches will be ideal to optimize the operational costs. The addition of certain chemicals in small amounts which may enhance hydrate dissociation (methane recovery) rate without having any toxic effects on the environment has caught the imagination of researchers worldwide although research focussing on this subject is still in its infancy.

Article titled 'Natural gas production from hydrate decomposition by depressurization" by C Jia et al. published in *Chemical Engineering Science,* 2001, 56, pp 5801-5814 reports natural gas production from the decomposition of methane hydrate in a confined reservoir by a depressurizing well. For different well pressures and reservoir temperatures, distributions of temperature and pressure in the porous layer of methane hydrate and in the gas region are evaluated.

U.S. Pat. No. 5,713,416 discloses a method of decomposing gas hydrates and releasing natural gas and water which involves combining a liquid (acid) with another liquid (base) which would react exothermically with each other to form a hot salt solution and subsequently contacting said gas hydrates with said hot salt solution.

U.S. Pat. No. 6,214,175 discloses a method for recovering gas by dissociating gas hydrates comprising the steps of: (a) providing the gas hydrate within an occupying zone; (b) positioning a source of electromagnetic radiation within the said gas hydrate occupying zone; and (c) recovering gas from said gas hydrates by applying electromagnetic radiation from the electromagnetic radiation source of step (b) to the gas hydrates at a frequency within the range of: from direct current to visible light, at energy density sufficient to dissociate the gas hydrates to evolve its constituent gas.

U.S. Pat. No. 7,879,767 disclosed An aqueous, viscoelastic fluid gelled with a viscoelastic surfactant (VES) is inhibited against hydrate formation with an effective amount of an additive that could be one or more halide salts of alkali metals and alkali earth metals, formate salts, alcohols, glycols, glycol amines, sugars, sugar alcohols, amidoamine oxides, polymers such as polyamines, polyvinylpyrrolidones and derivatives thereof, polyvinyl alcohols and derivatives thereof, polycaprolactams and derivatives thereof, hydroxyethylcellulose, and mixtures thereof. These fluids are inhibited against hydrate formation and may have increased viscosity as well. The additives may increase viscosity to the point where less VES is required to maintain a given viscosity. These inhibited, aqueous, viscoelastic fluids may be used as treatment fluids for subterranean hydrocarbon formations, such as in stimulation treatments, e.g. hydraulic fracturing fluids. The additive is soluble in the fluid and may be a halide salt of an alkali metal and/or an alkali earth metals, formate salts, alcohols, glycols, sugars, sugar alcohols, glycol amines, amidoamine oxides, polyamines, polyvinylpyrrolidones and derivatives thereof, polyvinyl alcohols and derivatives thereof, polycaprolactams and derivatives thereof, hydroxyethylcellulose, and mixtures thereof.

Article titled "Effects of biosurfactants on gas hydrates" by Amit Arora et al. published in Journal of Petroleum & Environmental Biotechnology 2014, 5:2 reports the effects of biosurfactants such as Rhamnolipid, Surfactin, Snomax, Emulsan, Phospholipids, Hydroxystearic acid etc. on Gas Hydrate formation.

Article titled "Methane Index: A tetraether archaeal lipid biomarker indicator for detecting the instability of marine gas hydrates" by Yi Ge Zhang et al. reports a molecular fossil proxy, i.e., the "Methane Index (MI)", to detect and document the destabilization and dissociation of marine gas hydrates. MI consists of the relative distribution of glycerol dibiphytanyl glycerol tetraethers (GDGTs), the core membrane lipids of archaea. The rational behind MI is that in hydrate-impacted environments, the pool of archaeal tetraether lipids is dominated by GDGT-1, -2 and -3 due to the large contribution of signals from the methanotrophic archaeal community. This study in the Gulf of Mexico cold-seep sediments demonstrates a correlation between MI and the compoundspecific carbon isotope of GDGTs, which is strong evidence supporting the MI-methane consumption relationship. Preliminary applications of MI in a number of hydrate-impacted and/or methane-rich environments show diagnostic MI values, corroborating the idea that MI may serve as a robust indicator for hydrate dissociation that is useful for studies of global carbon cycling and paleoclimate change.

Not much work has been done on dissociation of gas hydrates and there is a dearth of data in literature regarding the same. It is however imperative to thoroughly study dissociation of gas hydrates because of the different parameters involved in the hydrate dissociation process which need to be monitored and the potential challenges to be faced during hydrate dissociation in field scale operations.

Therefore, there is a real need at the moment for a process for dissociation of gas hydrates which will be ideal to optimize the operational costs. Accordingly, the present inventors find that the presence of a small amount of certain additives in the system in conjunction with changing the temperature and pressure conditions of the hydrate bearing sediment can significantly boost hydrate dissociation kinetics. These additives interact with water, forming hydrogen bonds and thus enhancing the rate of hydrate dissociation.

OBJECTS OF THE INVENTION

The main objects of the present invention is to provide a process for the dissociation of gas hydrates specifically of methane or natural gas into their constituent chemical species, namely the hydrate-forming gas and water in presence of suitable additive agents or suitable hydrate dissociation promoters.

SUMMARY OF THE INVENTION

Accordingly, the present invention provides a process for dissociation of natural gas hydrates in a reactor system using additive or dissociation promoter alone or in combination thereof said additives and/or promoters being in the range of 0.01 weight % to 5 weight %, the process comprising:
 i. injecting additives or hydrate dissociation promoters into the reactor system at a temperature ranging from 283-293 K;
 ii. optionally depressurizing the reactor system of step (i) to pressures 50% to 75% below the hydrate equilibrium pressure; i.e. the minimum pressure required to form and keep the hydrates stable at a given temperature.
 iii. recovering of methane or natural gases from step (i) and (ii).

In an embodiment of the present invention, said additives are in the form of nanoparticles with or without the loading of hydrogen bond modifiers.

In yet another embodiment of the present invention, said hydrogen bond modifiers are selected from synthetic polymers and chemical additives of inorganic or organic nature.

In another embodiment of the present invention, additives are selected from hydrophobic amino acids, zwitterionic compounds, betaines, silicone oils, long chain polysaccharides, amines, amine oxides, phospholipids, sophorolipids, lipids in the form of liposomes, allyl phenol, terpinol and related derivatives, hydrogen peroxide, ionic liquids, polysaccharides guar gum, gum arabic, xanthan gum, gellan gum, methanol, ammonia, amines and amine oxides, silicone oils, zwitterionic compounds such as bicine, trimethyl glycine, cocoamidopropyl betaine, hydrophobic amino acids and hydrogen bond forming compounds selected from hydroxyl propyl methyl cellulose, hydroxyl ethyl starch and pyrrole alone or in combinations thereof.

In still another embodiment, said liposomes are in the form of nanoparticles and said liposome nanoparticles are used alone or in conjunction with capping agents which are pegged as hydrogen bond modifiers.

In still another embodiment of the present invention liposomes is in the form of phospholipids and sophorolipids.

In an preferred embodiment of the present invention, said phospholipids are selected from the group consisting of 1-stearoyl-2-oleoyl-sn-glycero-3-phosphocholine, 1-palmitoyl-2-oleoyl-sn-glycero-3-phosphocholine, 1,2-dipalmitoyl-sn-glycero-3-phosphocholine, L-α-phosphatidylcholine.

In another embodiment of the present invention, said capping agents are selected from the group consisting of hydrophobic amino acids selected from histidine, tyrosine, threonine, tryptophan, proline, serine, glycine, zwitterionic compounds selected from trimethyl glycine, bicine, tricine, cocoamidopropyl betaine, polysaccharides selected from guar gum, gum arabic, xanthan gum, gellan gum and long chain polymeric molecules selected from polyvinyl pyrrolidone.

In another embodiment of the present invention, the process for the dissociation of gas hydrates specifically of methane or natural gas into their constituent chemical species, namely the hydrate-forming gas and water in presence of suitable additive agents or suitable hydrate dissociation promoters.

DETAILED DESCRIPTION OF THE INVENTION

Figure 1:
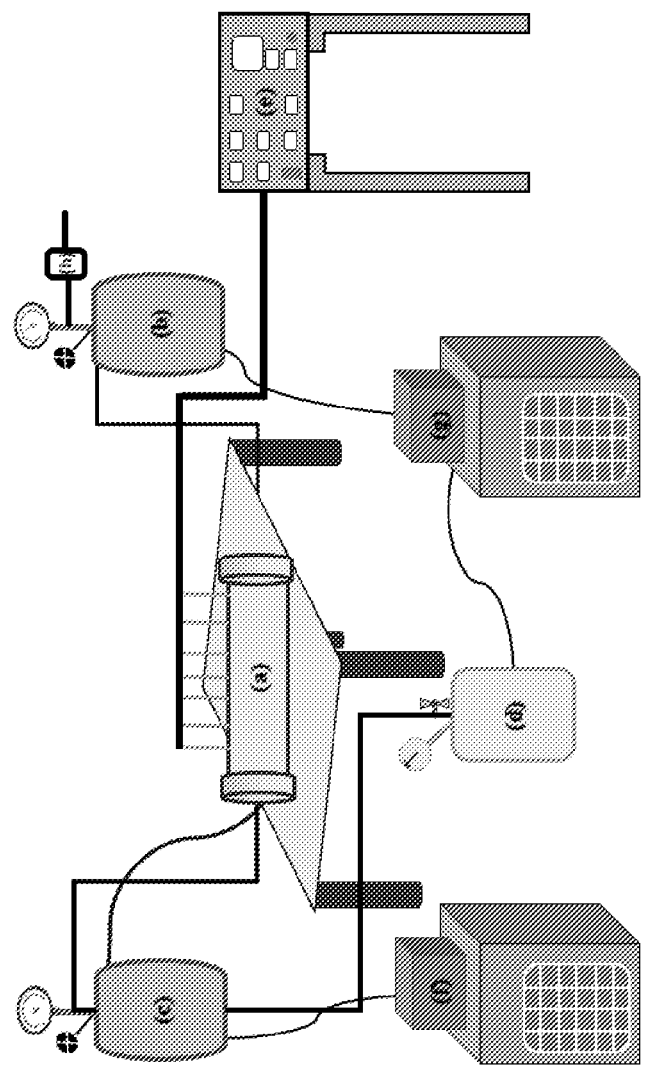
FIG. 1: Continuous Circulating Loop Large Scale Methane Recovery Setup (a) Crystallizer Vessel, (b) Reservoir Vessel, (c) Supply Vessel, (d) Water Tank (e) Data Acquisition System, (f) Chiller-1, (g) Chiller-2, (h) Mass Flow Controller

The invention will now be described in detail in connection with certain preferred and optional embodiments, so that various aspects thereof may be more fully understood and appreciated.

In an embodiment, the present invention provides a process for the dissociation of natural gas hydrates in presence of suitable additive agents leading to the recovery of methane or natural gas. It is proposed to inject these additives into the system in the form of aqueous streams.

The additives are to be used in conjunction with the thermal stimulation and depressurization approaches; injecting the additive stream at hydrate dissociation temperatures in conjunction with or without first depressurizing the system to pressures below the hydrate equilibrium pressure and such.

In another embodiment, the present invention provides a process for the dissociation of natural gas hydrates comprises injecting additives or hydrate dissociation promoters into the system at hydrate dissociation temperatures ranging from 283-293 K in conjunction with or without first depressurizing the system to pressures (50% to 75%) below the hydrate equilibrium pressure and such leading to the recovery of methane or natural gases.

In preferred embodiment, the present invention provides a process for the dissociation of marine gas hydrates into their constituent chemical species, namely the hydrate-forming gas and water in presence of suitable additive agents or suitable hydrate dissociation promoters in the range of 0.01 wt % to 5 wt %. Interaction of such compounds with water molecules is supposed to enhance hydrate dissociation kinetics. All the additives are benign or eco-friendly substances that pose no threat whatsoever to the environment or to biological marine life.

In another preferred embodiment, the present invention provides a process for the dissociation of marine hydrates using different classes of lipids such as phospholipids and sophorolipids in the form of liposomes (in nanoscale), i.e. liposome nanoparticles (~200 nm) in combination with suitable additives and solvents called here as hydrogen bond modifiers selected from different classes of compounds such as hydrophobic amino acids, zwitterionic compounds, betaines, silicone oils, long chain polysaccharides, alcohols, salts, amines, amine oxides, ionic liquids, ammonia, pyrrole etc, alone or in combinations thereof at concentrations ranging from 0.01 to 1 wt %. The concentrations are different for the two different types of additives. While in the first case, the concentration range is 0.01 to 5 wt % for the first case when no lipids are involved and 0.01 to 1 wt % when lipids are involved.

In yet another preferred embodiment present invention provides a new reactor design which can provide a continuous supply of water stream with or without suitable additives and at desired temperatures so as to enhance hydrate dissociation kinetics and achieve a continuous stream of recovered methane or natural gas.

In still yet another preferred embodiment, said suitable additive agents are selected from alcohols and salts, alone or in combinations thereof, allyl phenol, terpinol and related derivatives, hydrogen peroxide, ionic liquids, polysaccharides such as guar gum, gum arabic, xanthan gum, gellan gum, methanol, ammonia, amines and amine oxides, silicone oils, zwitterionic compounds such as bicine, trimethyl glycine, cocoamidopropyl betaine, hydrophobic amino acids, and other compounds capable of forming hydrogen bonds with water such as hydroxyl propyl methyl cellulose, hydroxyl ethyl starch and pyrrole.

In another embodiment, the invention presents the efficacy of the suggested benign additives as hydrate dissociation promoters through the energy and efficiency analysis for gas production from formed hydrates in the presence of the additives.

In still another embodiment, the present invention provides a platform technology of nanoparticles loaded with hydrogen bond modifiers, such nano particles/modifiers/solvents may or may not belong to lipids, synthetic polymers, chemical additives or inorganic or organic nature which is benign to marine environment in sufficiently small doses so as to facilitate recovery of methane or natural gas from their already existing hydrates.

In still yet another embodiment, the present invention discloses the use of the liposome nanoparticles by themselves or in conjunction with different capping agents which are pegged as hydrogen bond modifiers. Capping agents may be selected from different classes of compounds such as hydrophobic amino acids, zwitterionic compounds, betaines, alcohols, polymeric compounds, polysaccharides or such. Capping agents may comprise any benign and eco-friendly compound from any of the above mentioned classes. Liposome nanoparticles and capping agents is used in concentrations ranging from 0.01-0.1 wt %. The concentrations are different for the two different types of additives. While in the first case, the concentration range is 0.01 to 5 wt % for the first case when no lipids are involved and 0.01 to 1 wt % when lipids are involved.

In still yet another preferred embodiment, the phospholipids are selected from such as 1-stearoyl-2-oleoyl-sn-glycero-3-phosphocholine (SOPC), 1-palmitoyl-2-oleoyl-sn-glycero-3-phosphocholine (POPC), 1,2-dipalmitoyl-sn-glycero-3-phosphocholine (DPPC), L-α-phosphatidylcholine (Soy PC). This embodiment covers all phospholipids.

In still another preferred embodiment, the additives to cap and load the liposome nanoparticles are selected from hydrophobic amino acids such as histidine, tyrosine, threonine, tryptophan, proline, serine, glycine, zwitterionic compounds such as trimethyl glycine, bicine, tricine, cocoamidopropyl betaine (CAPB), polysaccharides such as guar gum, gum arabic, xanthan gum, gellan gum, long chain polymeric molecules such as polyvinyl pyrrolidone (PVP).

In the present invention, phospholipid nanoparticles are loaded with hydrogen bond modifiers. Nanoparticle sized vesicles (liposomes) of the phospholipids are created which will serve as a platform to be loaded with other hydrophilic compounds that interact strongly with water molecules. The advantage of this process is that phospholipids as well as the compounds proposed for loading and capping the liposome nanoparticles are both likely to work as hydrogen bond modifiers thus facilitating the hydrate dissociation process.

Figure 2:
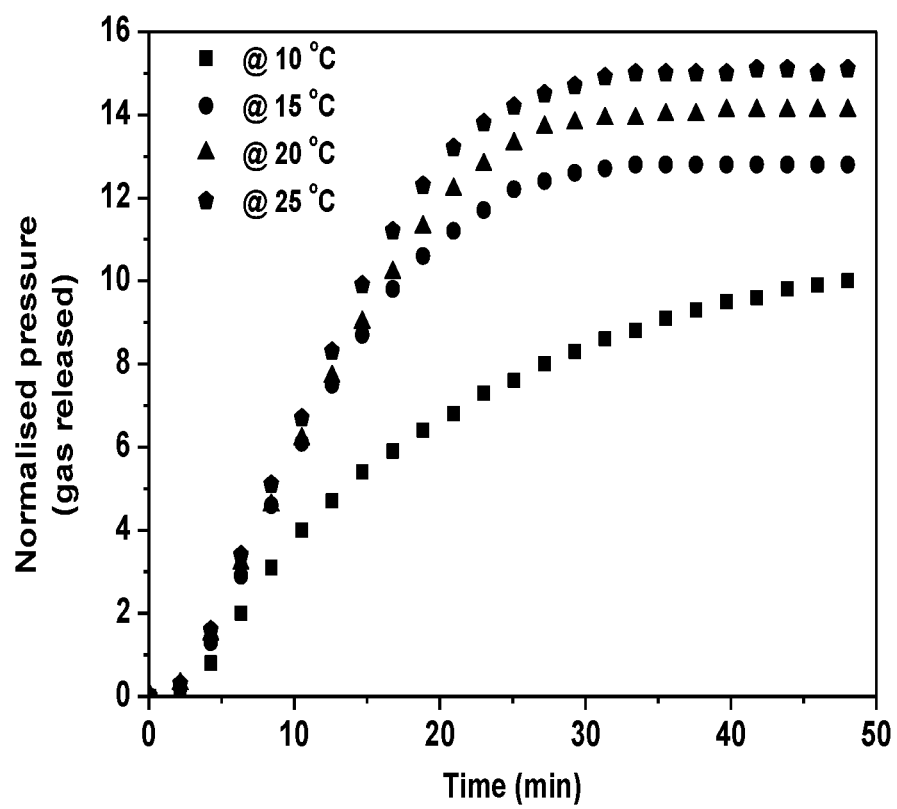
FIG. 2: Hydrate dissociation (gas release profile) from methane hydrate bearing sediment at different dissociation temperatures.
Figure 4:
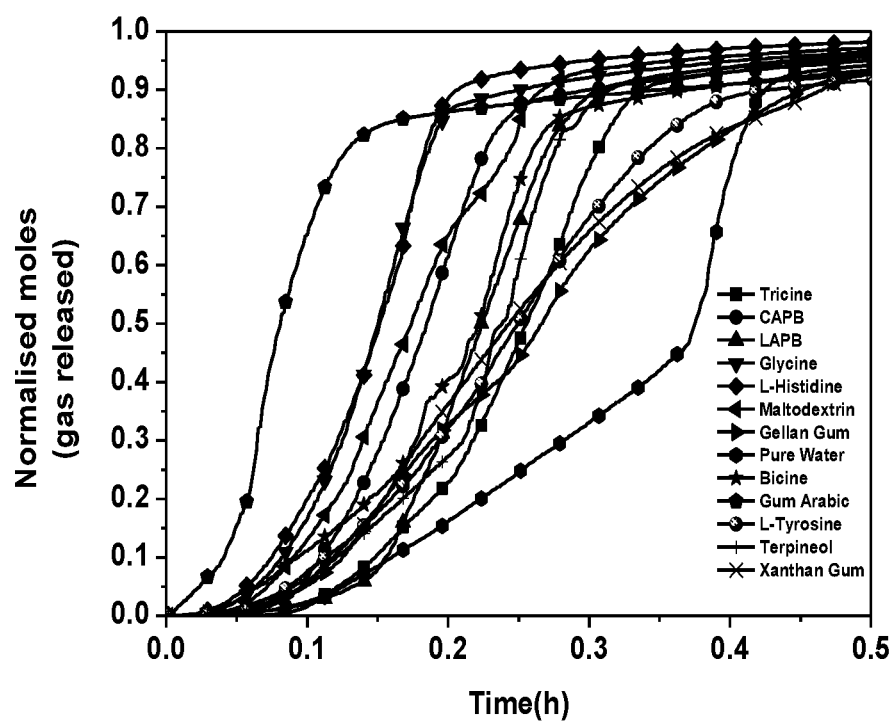
FIG. 4: Normalized moles of gas released vs. Time (h) for all the additives studied: Dissociation at 293 K. Fresh runs. Concentration of all the additives: 1 wt %.

FIG. 1 depicts the Continuous Circulating Loop Large Scale Methane Recovery Setup (*a*) Crystallizer Vessel, (*b*) Reservoir Vessel, (*c*) Supply Vessel, (*d*) Water Tank (*e*) Data Acquisition System, (*f*) Chiller-1, (*g*) Chiller-2, (*h*) Mass Flow Controller FIG. 2 shows the gas release profile during pure methane hydrate dissociation at different set temperatures. FIG. 4 shows the rate of methane hydrate dissociation varies greatly between 10 and 15° C. As the temperature goes up to 20° C. and even 25° C., there is not much difference in the rate of hydrate dissociation. In fact, the difference in rates is so small that it can actually be neglected. When dissociating methane hydrates, therefore, it is not necessary to go up to very high temperature gradient of say, ~20 or 25° C. as the same is achieved at a relatively lower temperature gradient of ~15° C.

Figure 3:
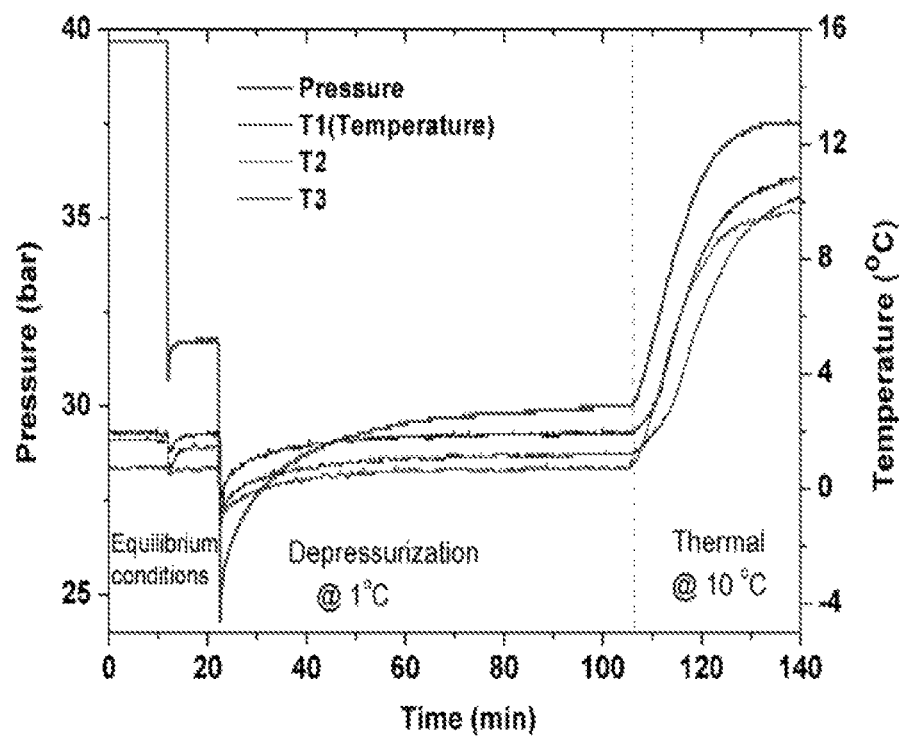
FIG. 3: Hydrate dissociation from methane hydrate bearing sediment using the simultaneous depressurization and thermal stimulation approach
Figure 6:
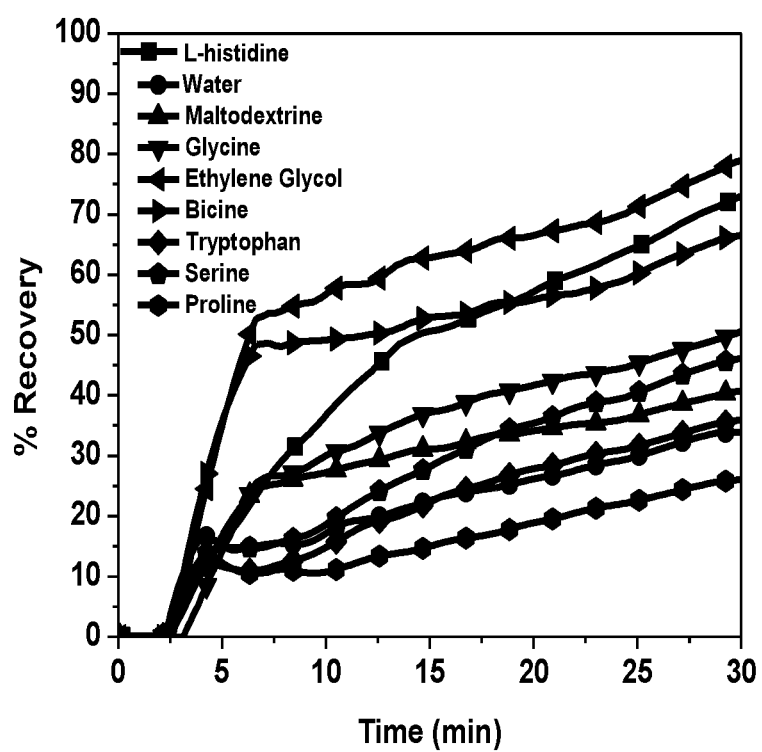
FIG. 6: % Methane recovery vs time (min) for hydrate dissociation affected by the injection of benign additive-water mixtures into the large scale continuous apparatus (0.1 wt % and 10 ml/min)

FIG. 3 shows the dissociation data for a typical run in which the hydrate is dissociated using a combination of depressurization and thermal stimulation. FIG. 6 shows that depressurization alone is not very effective in dissociating gas hydrates. The depressurization is done at a constant temperature (274K) and after some time, the pressure inside the reactor as a result of partial dissociation of gas hydrate, is such that it reaches the hydrate stability region. Now, in order to completely decompose the hydrate, the temperature of the system is increased. Once the temperature of the system is increased, the hydrate moves out of its stability zone and further dissociation of the hydrate begins. Thus, the combination of depressurization and thermal stimulation is a very attractive route for dissociation of gas hydrates with the advantages being two-fold: a) reduced cost of operation and less energy intensive as the temperature gradient to be maintained is much lesser than that required for the thermal stimulation method on its own and b) the kinetics of hydrate dissociation which is very slow when using the depressurization method individually can be substantially beefed up by using a combination of the depressurization and thermal stimulation methods.

FIG. 4 plots the normalised moles of gas released during dissociation at 293 K for the fresh runs for all the different additives studied and compares them with that obtained using pure water. These experiments were carried out in a dedicated stirred tank reactor setup for additive selection. As can be seen from the figure, all the additives used considerably enhance the kinetics of methane hydrate dissociation at 293 K. From FIG. 4, it becomes clear that the additives have a potential to enhance hydrate dissociation kinetics. A few of these such as Gum Arabic, Bicine (the zwitterionic molecule) and some of the hydrophobic amino acids (L-histidine and Glycine), CAPB etc.

Figure 5:
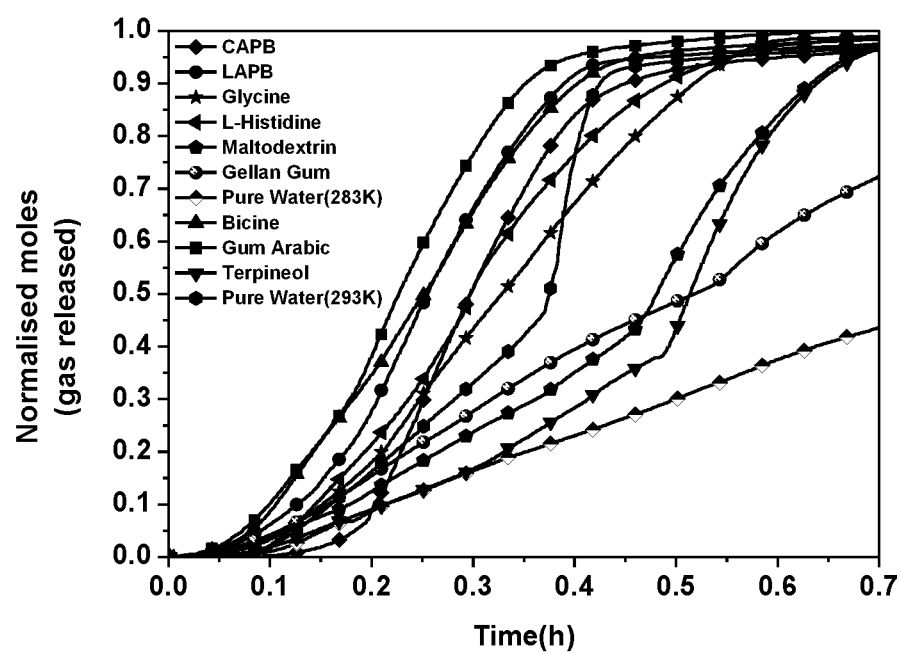
FIG. 5: Normalized moles of gas released vs. Time (h) for all the additives studied: Dissociation at 283 K. Fresh runs. Concentration of all the additives: 1 wt %.

FIG. 5 plots the normalised moles of gas released during dissociation at 283 K for the fresh runs for all the different additives and compares them with that obtained using pure water at a) 283 K and b) 293 K. These are again experiments that were carried out in the dedicated stirred tank reactor setup for additive selection. Once again, all the additives used considerably enhance the kinetics of methane hydrate dissociation at 283 K. The presence of a number of the additives such as Gum Arabic, Bicine, L-histidine, Glycine, LAPB and CAPB in the system returns much enhance kinetics even at 283 K when compared to that with pure water at 293 K. The main take away from this figure is that almost all the additives used show higher methane recovery after 18 minutes when hydrate dissociation is carried out at 283 K as compared to that obtained with pure water at 293 K. The information garnered from FIG. 5 is extremely important as this can have major implications when recovering natural gas from hydrates on a commercial scale. A difference of 10 degrees achieved at lab scale can translate into a major economic advantage at field scale.

FIG. 6 plots the methane recovery obtained using the continuous apparatus for the pure water system and in the presence of a number of benign additives identified by us. The flow rate of the injected solution is kept constant at 10 ml/min for all the experiments conducted. Here, all the additives are used in the same concentration (0.1 wt %). Methane recovery has been shown for the first thirty minutes of hydrate dissociation. As can be seen in FIG. 16, out of all the novel benign additives tested, Histidine (a polar amino acid) serves our purpose the best by considerably speeding up the hydrate dissociation process with Bicine (a zwitterionic molecule) not far behind. With the sole exception of Proline, all the additives tested show nice enhancement of methane hydrate dissociation kinetics as compared to pure water and at an extremely low concentration of 0.1 wt %. It can also be seen from FIG. 6 that the presence of ethylene glycol (0.1 wt %) affects the hydrate dissociation kinetics more favorably than all the novel benign additives studied so far. This is more or less expected as ethylene glycol is a thermodynamic inhibitor and its presence in the system shifts the hydrate equilibrium conditions to more drastic conditions thus rendering the hydrates unstable which is something that does not happen in the case of l-histidine. However, this does not necessarily make ethylene glycol the additive better suited for purpose the additives are supposed to be injected into a natural environment and hence first and foremost should be benign and environment friendly. Sadly ethylene glycol does not serve this purpose which makes the use of ethylene glycol in hydrate dissociation highly unlikely. Compounds like l-histidine and bicine on the other hand are benign and don't need to be used in very large doses thus making them great candidates for use as additives to enhance hydrate decomposition kinetics.

Figure 7:
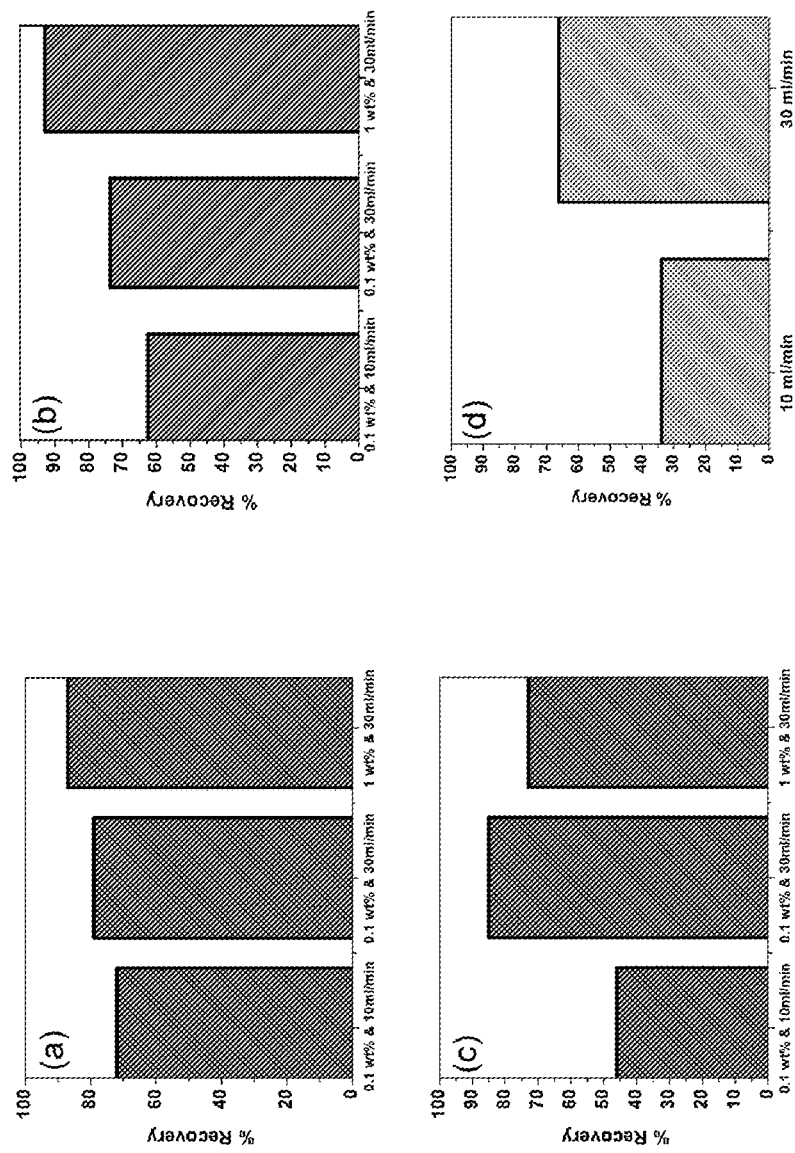
FIG. 7: Comparison of % methane recovery at varying injection flow rate and concentration for a) L-histidine b) Bicine c) Serine d) pure water

FIGS. 7 (a), (b) and (c) show the % recovery comparison for the additives Histidine, Bicine and Serine respectively. % recovery has been compared at varying injection flow rates and concentrations of additives and plotted for the first 30 minutes of hydrate dissociation. As can be seen from all three figures, increasing the injection flow rate leads to increase in the % recovery of methane in the first 30 minutes. This belief is further confirmed by FIG. 7(d) which compares the % methane recovery obtained using pure water at two different flow rates (10 ml/min and 30 ml/min). From FIG. 8(d), it becomes amply clear that the % of methane recovery increases on increasing the injection flow rate. While increasing the concentration of additive also leads to increase in % methane recovery in the cases of Histidine and Bicine, in the case of Serine, the % methane recovery for the first 30 minutes of hydrate dissociation drops by around 10% on increasing its concentration from 0.1 wt % to 1 wt %. Thus it can be concluded that while increase of flow rate given that additive concentration is kept constant most certainly leads to increase in the % recovery of methane, increasing the additive concentration may not always lead to enhanced kinetics of hydrate dissociation given that the injection flow rate is kept constant. A maximum methane recovery of around 95% could be obtained for the first 30 minutes of hydrate dissociation with 1 wt % Bicine as the additive and at a flow rate of 30 ml/min.

Figure 8:
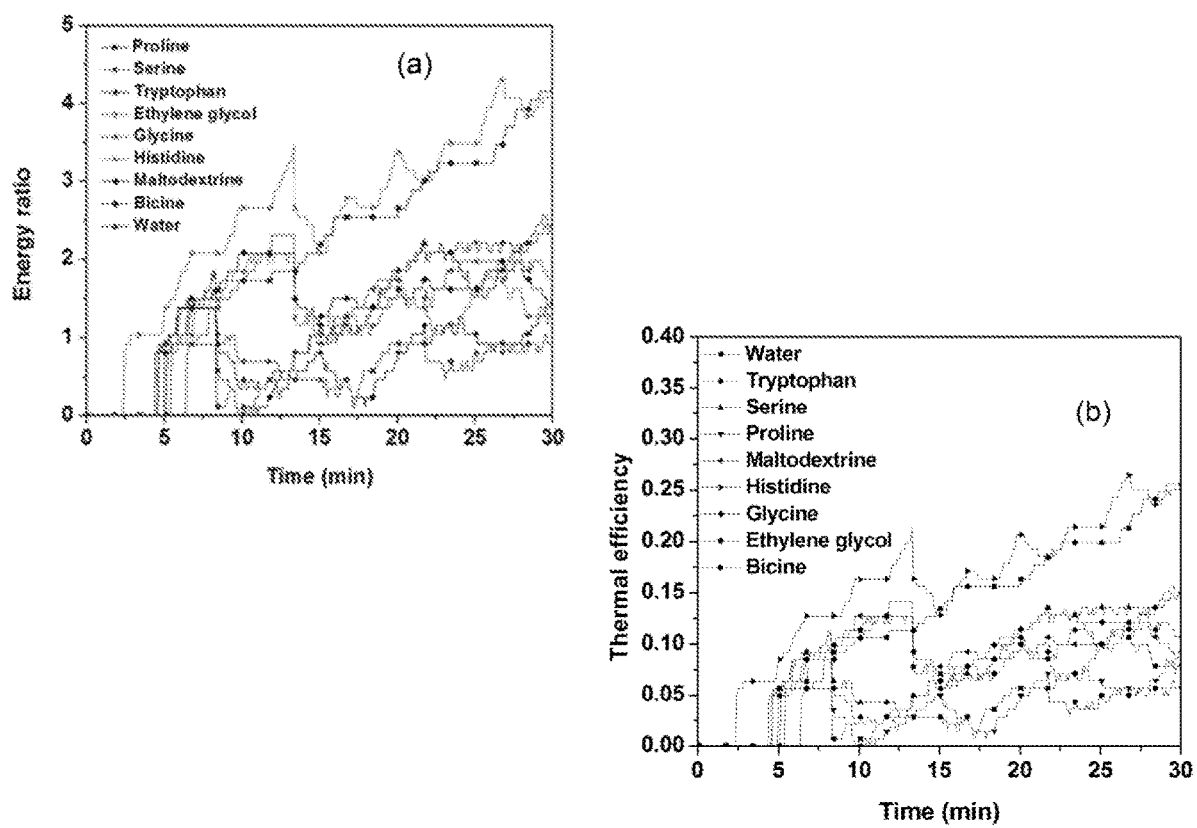
FIG. 8: (a) Comparison of energy ratio during hydrate dissociation in presence of different benign additives (0.1 wt % and 10 ml/min). (b) Comparison of thermal efficiency during hydrate dissociation in presence of different benign additives (0.1 wt % and 10 ml/min).

FIG. 8(a) plots the energy ratio with respect to time for the first 30 minutes of hydrate dissociation obtained in presence of the different additives used (at concentration of 0.1 wt % and injection flow rate of 10 ml/min). It can be seen that the energy ratio follows the same trend for all the additives used. Histidine shows the highest energy ratio closely followed by Bicine. The rest of the additives follow with all the additives showing higher energy ratio as compared to pure water. FIG. 8(b) plots the variation of thermal efficiency with respect to time for the first 30 minutes of hydrate dissociation obtained in presence of the different additives used (at concentration of 0.1 wt % and injection flow rate of 10 ml/min). The trend followed is the same as observed with the energy ratio with the Histidine system showing the highest thermal efficiency followed by Bicine and so on. All the additives with the sole exception of Proline show better thermal efficiency for the hydrate dissociation process as compared to pure water.

Figure 9:
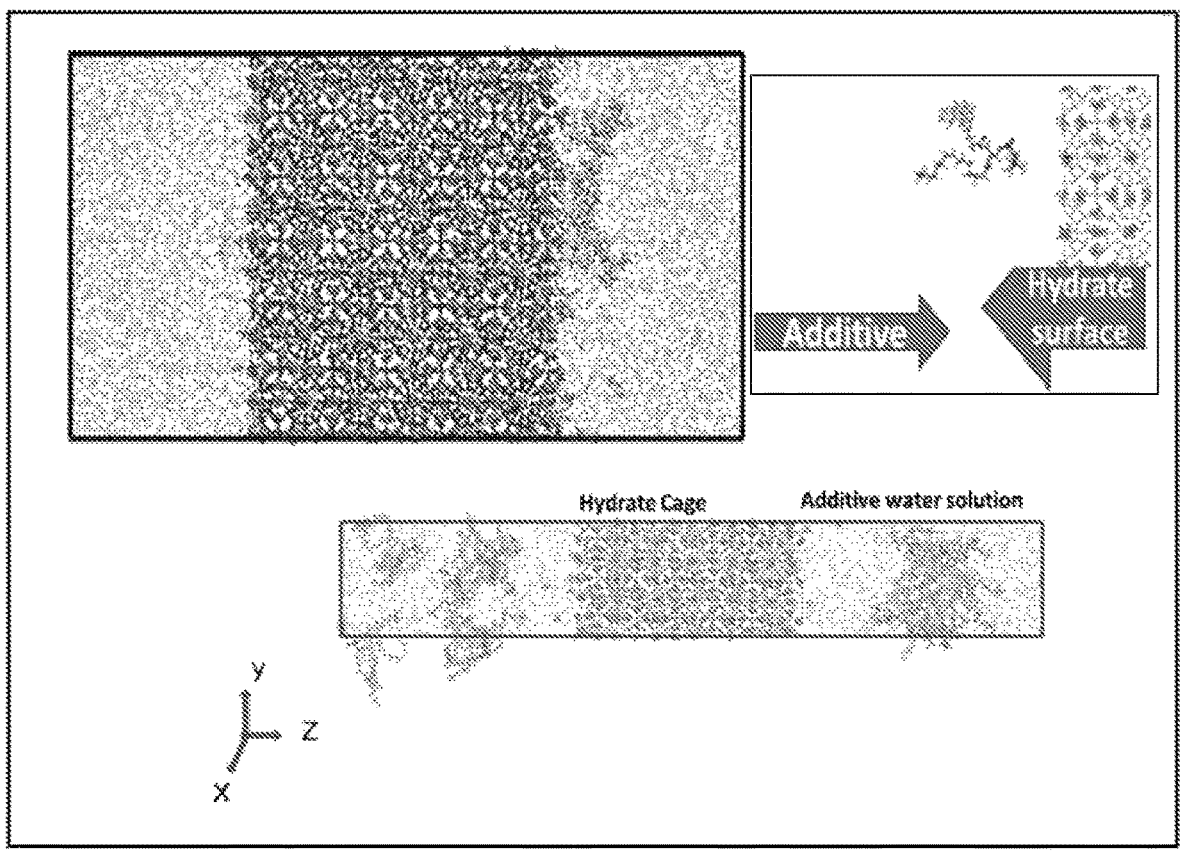
FIG. 9: Schematic for interaction of additive with methane hydrate surface.

FIG. 9 shows a basic schematic for interaction of an additive with methane hydrate surface. The methodology for dissociation studies using MD simulation is developed based on actual geological conditions in deep ocean settings. Simulation pressure of 100 bar pressure is chosen to mimic 100-meter depth of the ocean. In the simulations, extreme temperatures (290 K and 320 K) are used which are higher than the equilibrium hydrate temperature at 100 bar for methane hydrates (285 K). Temperature 290K corresponds to the water temperature at sea surface and 320 K represents the usage of a much higher temperature. As per the schematic idea shown in FIG. 9, an additive can interact with hydrate surface and thus have a significant effect on the hydrate-water interface. In the simulations, the hydrate-water interface is developed in such a way that additive solution interacts with hydrate surface and significant effects on intrinsic kinetics at molecular level can be investigated.

Figure 10:
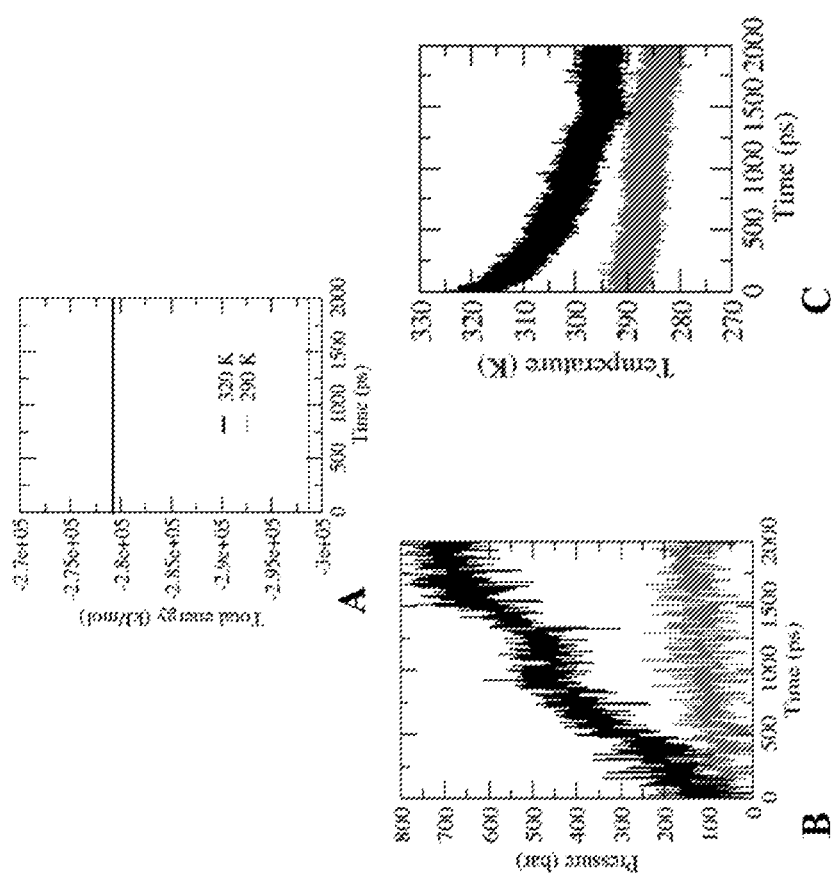
FIG. 10: Typical pressure (b) and temperature (c) profile of a system during gas hydrate decomposition.

FIG. 10 shows the typical pressure and temperature change of the system during hydrate dissociation in molecular dynamic simulation runs. As gas hydrate decomposes, the temperature of the system decreases sue to the endothermic nature of hydrate dissociation and pressure increases due to release of gas stored in the form of hydrate while the total energy of system stays constant.

Figure 11:
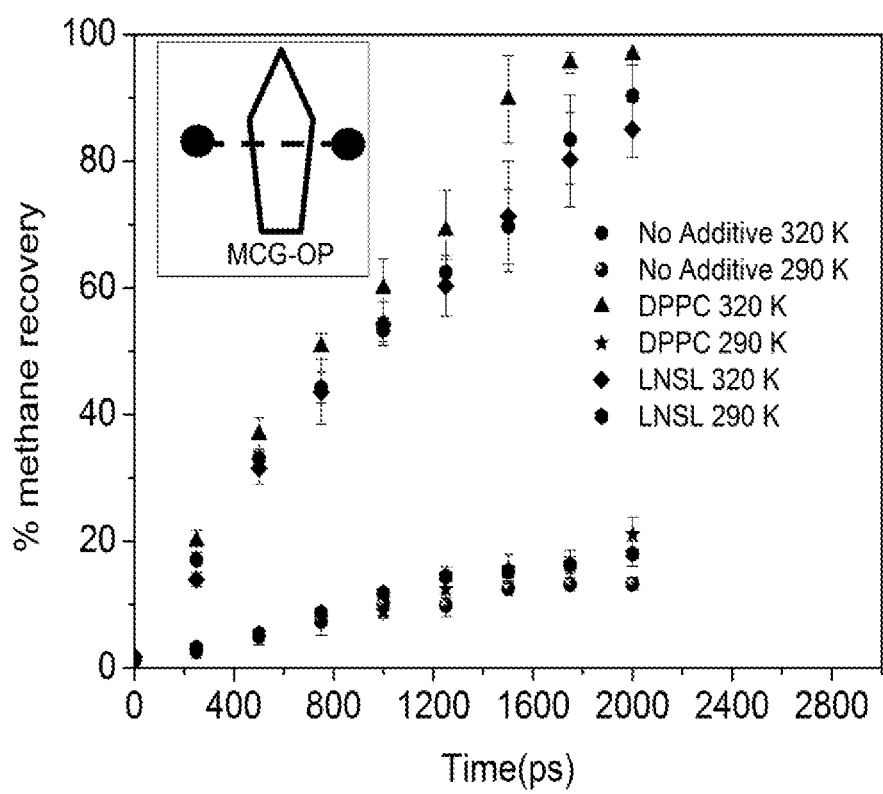
FIG. 11: Variation of methane recovery with time during hydrate dissociation in presence of Lipids and comparison with pure water. Inset: Representation of MCG-OP order parameter.

To get structural and dynamic properties of systems, the obtained trajectories from simulations are quantified using statistical relationships and crystal structural parameters. MCG-OP mutually coordinated guest order parameter are calculated for hydrate water molecules and have been shown in FIG. 11 (inset). MCG-OP which can classify the hydrate and non-hydrate clusters in the system is calculated as explained in the following passage. First those methane molecules that are 0.5-0.9 nm apart from each other are identified and tagged; thereafter the number of water molecules that make 20-55° angles with the vector between the tagged methane molecules is identified. In addition, the water molecules should also simultaneously be at a distance of ~0.6 nm or less with respect to tagged methane. If all these criteria are satisfied and the number of water molecules are equal to or more than five, then it can be assumed that methane atoms are in a hydrate like a cluster (1 MCG cluster). A large crystal of methane hydrate can have many MCG clusters and one methane molecule can participate in multiple MCG clusters by coordinating with multiple adjacent methane molecules. Therefore, adjacent methanes of MCG clusters can be identified and mapped as one large hydrate crystal using depth-first search method. MCG-OP thus can give the size of the largest hydrate crystal present in that system. From the MCG-OP, the methane recovery is calculated in terms of percentage of methane that is not part of the largest MCG cluster. Variation of the methane recovery (%) calculated through MCG-OP vs. Time (ps) for methane hydrate dissociation in presence of Lipids are shown and compared with those for pure water in FIG. 11. At both 320 K and 290 K dissociation temperatures, DPPC system showed the highest and fastest methane recovery for all the systems studied. While at the lower dissociation temperature, both DPPC and LNSL showed promoting behavior, at the higher dissociation temperature of 320 K, only DPPC showed promoting behavior. This is because at 290 K, the dissociation is mainly additive driven (thus highlighting that both additives can work as hydrate dissociation promoters), at the much higher temperature of 320 K, dissociation is kinetic driven thus overshadowing the effect of the additives on hydrate dissociation.

Figure 12:
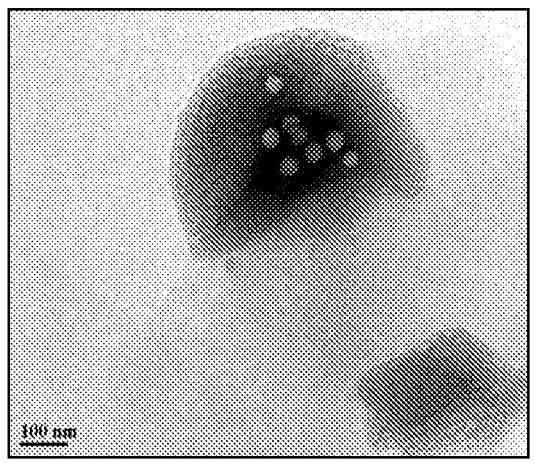
FIG. 12: Representative TEM images of (A) DPPC, (B) SOPC and (C) POPC liposomes.
Figure 12:
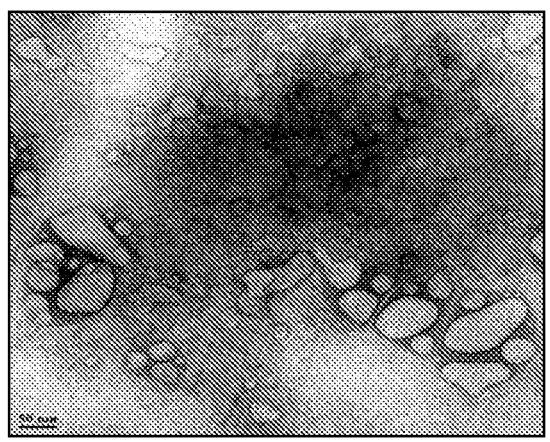
Figure 12:
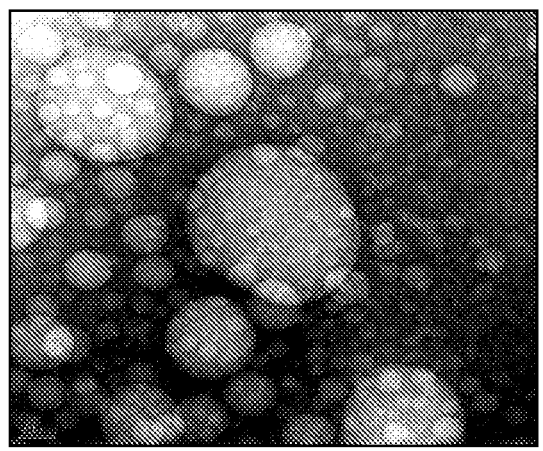

The phospholipid liposomes are synthesized using the film deposition method. The size and morphology of the as such formed liposomes are characterized by the TEM tool and the representative images are provided for the respective characterizations made as FIGS. 12(a), (b) and (c).

Figure 13:
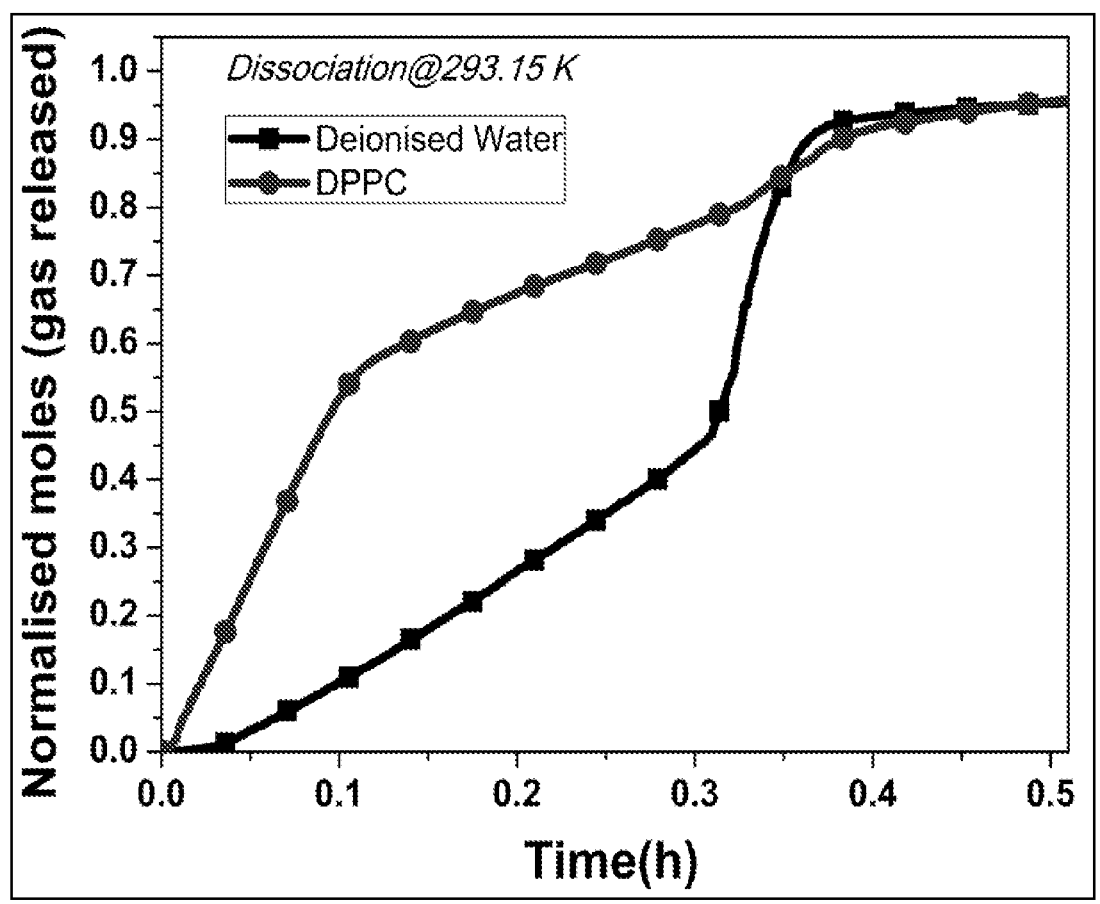
FIG. 13: Normalized moles of gas released vs. Time (h) for a stable liposome (DPPC) system

The DPPC, 0.025 wt % concentration system showed much faster gas hydrate dissociation as compared to the pure water system at the dissociation temperature of 293 K (FIG. 13). The dissociation kinetics in presence of DPPC is almost 4 times that for pure water after the first 12 minutes which makes it an excellent additive for use as a hydrate dissociation promoter. The faster release kinetics of DPPC showed that phospholipids may also be used in the GHs technology with greater environment safety and no toxic effects. The enhanced kinetics of hydrate dissociation phenomenon in presence of DPPC Liposomes may be attributed to the fact that liposomes having hydrophilic surface along with the polar functional groups show great affinity towards the formation of hydrogen bonds with the water molecules. As soon as the temperature is increased, the hydrophilic groups on the liposomes get activated with more power to attract water molecules. Additionally, the zwitterionic association between the phosphate and ammonium group provides more polarity to the liposomes and hence may attract large number of water molecules. The presence of charge destabilizes the formation of any crystal structures but engages large number of water molecules. At the liposome surface, other groups and vesicles may snatch more and more water from the hydrate structures and thus destabilize the hydrate cages and bring about an enhancement in the kinetics of hydrate dissociation.

EXAMPLES

Following examples are given by way of illustration therefore should not be construed to limit the scope of the invention.

Example 1

Identification of Benign Additives Using the Dedicated Setup for Additive Selection Experiments were carried out in a dedicated stirred tank reactor setup for additive selection. It has a volume of ~252 ml and is equipped with 1 inch transparent windows (made up of submarine glass) on opposite ends of the vessel in order to observe the morphology of the hydrate formation and dissociation process. Photographic representations of the experimental setup are given in FIG. 1. All experiments were conducted at 274 K temperature and 5.0 MPa pressure using pure methane gas as the hydrate former. Methane hydrate dissociation is studied at two different temperatures, 283 K and 293 K using the thermal stimulation approach. It is observed that the presence of 1 wt % of the additives in the system not only considerably enhances dissociation kinetics as compared with pure water at 293 K but a number of the additives were able to achieve much faster kinetics even during dissociation at 283 K as compared to that with pure water at 293 K.

Example 2

Injection of Additives to Enhance Hydrate Dissociation Kinetics: Continuous Flow Loop Circulating Apparatus:

Representations of the continuous flow loop apparatus are shown as FIGS. 2 and 3. The additives were tested in a continuous manner utilizing the flow loop setup as shown below. This reactor simulates the subsea condition; which comprises the native subsea pressure and temperature conditions of up to 200 bar and ranging from −5 to 10° C. respectively and the hydrate bearing sediment present inside the sea composed mainly of silica sand and clay. Suitable arrangements has been made to synthetically form the hydrate at constant pressure and then study the decomposition kinetics by circulating additive laden sea water/fresh water for studying the effect of additives on decomposition kinetics. Set of eight thermocouples measures the temperature of the bed (which simulates the lithography of sea bed) during hydrate formation and decomposition process. The pressure of the setup is maintained by a flow meter which runs in a pressure control mode and gives the moles of gas flowing in or flowing out of the reactor at high pressure. High pressure metering is used for water flow with back pressure. The flow loop apparatus is designed primarily to identify the best potential additives to act as hydrate dissociation promoters but also to give information regarding the optimum concentration of additive and the optimum flow rate of the additive-water stream required to maximize enhancement in hydrate dissociation kinetics.

Example 3

Screening and Testing Using Molecular Dynamic (MD) Simulations

The additives are first screened and tested using molecular dynamic (MD) simulations. Based on results obtained from MD simulations are then validated experimentally to identify the best candidates to enhance hydrate dissociation kinetics. Phospholipid nanoparticles (liposomes) are synthesized which are then either to be used individually or to be coated with the additives selected through quantum mechanical calculation followed by MD simulation and experimentation. A stirred tank reactor is used to carry out the experiments using the phospholipid nanoparticles suspended in water to test their efficacy as hydrate dissociation promoters. Experiments is carried out both with the hydrates initially present in the system and injection of phospholipid nanoparticles into the system so as to facilitate the dissociation of hydrates and with the formation of hydrates in presence of phospholipid nanoparticles followed by dissociation of the same. All the additives are used in concentrations ranging from 0.01-0.5 wt %. Hydrate dissociation was carried out at the dissociation temperature of 293 K.

Example 4

Hydrate Dissociation in Presence of Phospholipid Nanoparticle 1,2-Didecanoyl-sn-glycero-3-phosphocholine (DPPC), having crystallization temperature 313 K) liposome was used as a model phospholipid additive for investigation as a gas hydrate dissociation promoter. 2 ml solution of nano-sized-lipid-vesicular system (containing 20 mg of DPPC liposomes) was used for 80 ml of de-ionized water in the reactor initially maintained at 275.15 K. The system was pressurized with 50 bar methane. Firstly, gas hydrate formation experiments were carried out at the pressure and temperature conditions mentioned above in-order to understand the effect of DPPC liposome on the formation behaviour of gas hydrates followed by the investigations on the DPPC liposome system a gas hydrate dissociation promoter. Hydrate dissociation was carried out at 293 K.

ADVANTAGES OF THE INVENTION

Changing temperature or pressure parameters alone can be demanding both in terms of expenses and time which can be favorably moderated in the presence of additives.

It is proposed to use the additives in low doses in conjunction with the thermal stimulation and depressurization approaches thus increasing the efficiency as well as cost effectiveness of both these processes.

These additives work well even at low dissociation temperatures (283 K). The amount of energy that can be saved on a commercial scale by making use of this property of these additives is a major argument in favor of the viability of using these additives as hydrate dissociation promoters. This brings the use of available deep ocean water which is present at native subsea temperature into the picture.

The primary advantage of using these additives is that they are benign and pose no threat to the environment which is our primary concern when using these low dosage additives.

The proposed additives have shown a marked increase in the energy ratio and thermal efficiency of the gas production process as compared to pure water which makes these additives attractive options for use as hydrate dissociation promoters.

The use of the bench scale continuous circulating flow loop apparatus is beneficial as it gives us a realistic idea of how these additives are expected to behave if used in a real world scenario.

Phospholipids as well as the compounds proposed for loading and capping the liposome nanoparticles are both likely to work as hydrogen bond modifiers thus facilitating the hydrate dissociation process.

All the additives being looked at here are benign or eco-friendly substances that pose no threat whatsoever to the environment or to biological marine life which is our primary concern when using these low dosage additives.

All the additives being discussed are to be used in incredibly low doses which, is a major advantage as compared to already existing chemical inhibitors which are usually used in exceedingly large quantities. It is very important to use the additives in as low concentrations as possible even though the additives may be benign.

We claim:

1. A process for dissociation of natural gas hydrates in a reactor system using at least one additive in the form of nanoparticles, wherein the at least one additive is a hydrate dissociation promoter, and wherein the at least one additive is in the range of 0.01 weight % to 5 weight % of an aqueous composition, the process comprising:
   i. injecting the aqueous composition into the reactor system containing the natural gas hydrates at a temperature ranging from 283-293 K;
   ii. optionally depressurizing the reactor system of (i) to pressures 50% to 75% below the hydrate equilibrium pressure; and
   iii. recovering methane or natural gases from (i) and (ii).

2. The process as claimed in claim 1, wherein the at least one additive is with or without the loading of hydrogen bond modifiers.

3. The process as claimed in claim 2, wherein the hydrogen bond modifiers are selected from synthetic polymers or chemical additives of inorganic or organic nature.

4. The process as claimed in claim 1, wherein the at least one additive is selected from hydrophobic amino acids, zwitterionic compounds, silicone oils, amines, amine oxides, phospholipids, sophorolipids, lipids in the form of liposomes, allyl phenol, terpineol, terpinyl acetate, hydrogen peroxide, ionic liquids, polysaccharides, or hydrogen bond forming compounds.

5. The process as claimed in claim 4, wherein the liposomes are in the form of nanoparticles and the liposome nanoparticles are used alone or in conjunction with capping agents which are pegged as hydrogen bond modifiers.

6. The process as claimed in claim 4, wherein the liposomes are in the form of phospholipids and sophorolipids.

7. The process as claimed in claim 6, wherein the phospholipids are selected from the group consisting of 1-stearoyl-2-oleoyl-sn-glycero-3-phosphocholine, 1-palmitoyl-2-oleoyl-sn-glycero-3-phosphocholine, 1,2-dipalmitoyl-sn-glycero-3-phosphocholine, and L-α-phosphatidylcholine.

8. The process as claimed in claim 5, wherein the capping agents are selected from the group consisting of hydrophobic amino acids selected from histidine, tyrosine, threonine, tryptophan, proline, serine, glycine, zwitterionic compounds selected from trimethyl glycine, bicine, tricine, cocoamidopropyl betaine, polysaccharides selected from guar gum, gum arabic, xanthan gum, and gellan gum.

9. The process as claimed in claim 4, wherein the hydrophobic amino acids are selected from the group consisting of L-histidine, glycine, tyrosine, tryptophan, proline, and serine.

10. The process as claimed in claim 4, wherein the zwitterionic compounds are selected from the group consisting of betaines, bicine, tricine, trimethyl glycine, and cocoamidopropyl betaine.

11. The process as claimed in claim 4, wherein the hydrogen bond forming compounds are selected from hydroxyl propyl methyl cellulose, hydroxyl ethyl starch, or pyrrole alone or in combinations thereof.

12. The process as claimed in claim 4, wherein the polysaccharides are selected from the group consisting of guar gum, gum arabic, xanthan gum, and gellan gum.

* * * * *